US006595056B2

(12) United States Patent
Stewart

(10) Patent No.: US 6,595,056 B2
(45) Date of Patent: Jul. 22, 2003

(54) MICROMACHINED SILICON GYRO USING TUNED ACCELEROMETER

(75) Inventor: Robert E. Stewart, Woodland Hills, CA (US)

(73) Assignee: Litton Systems, Inc, Woodland Hills, CA (US)

( * ) Notice: Subject to any disclaimer, the term of this patent is extended or adjusted under 35 U.S.C. 154(b) by 0 days.

(21) Appl. No.: 09/778,434

(22) Filed: Feb. 7, 2001

(65) Prior Publication Data

US 2002/0104378 A1 Aug. 8, 2002

(51) Int. Cl.[7] .............................................. G01P 15/00
(52) U.S. Cl. .................. 73/514.29; 73/504.04
(58) Field of Search .............................. 73/504.03, 510, 73/511, 512, 511.01, 514.21, 514.22, 514.23, 514.24, 514.36, 514.37, 514.38, 504.12, 504.04, 504.02, 504.15

(56) References Cited

U.S. PATENT DOCUMENTS

| | | |
|---|---|---|
| 4,336,718 A | 6/1982 | Washburn |
| 4,483,194 A | 11/1984 | Rudolf |
| 4,510,802 A | 4/1985 | Peters |
| 4,512,192 A | 4/1985 | Peters |
| 4,553,436 A | 11/1985 | Hansson |
| 4,583,404 A | 4/1986 | Bernard et al. |
| 4,584,885 A | 4/1986 | Cadwell |
| 4,592,233 A | 6/1986 | Peters |
| 4,660,418 A | 4/1987 | Greenwood et al. |
| 4,679,434 A | 7/1987 | Stewart |
| 4,699,006 A | 10/1987 | Boxenhorn |
| 4,744,248 A | 5/1988 | Stewart |
| 4,750,364 A | 6/1988 | Kawamura et al. |
| 4,766,768 A | 8/1988 | Norling et al. |
| 4,795,258 A | 1/1989 | Martin |
| 4,841,773 A | 6/1989 | Stewart |
| 4,945,765 A | 8/1990 | Roszhart |
| 4,996,877 A | 3/1991 | Stewart et al. |
| 5,006,487 A | 4/1991 | Stokes |
| 5,007,289 A | 4/1991 | Stewart et al. |
| 5,008,774 A | 4/1991 | Bullis et al. |
| 5,016,072 A | 5/1991 | Greiff |
| 5,025,346 A | 6/1991 | Tang et al. |
| 5,065,627 A | 11/1991 | Stewart et al. |
| 5,205,171 A | 4/1993 | O'Brien et al. |
| 5,241,861 A | 9/1993 | Hulsing, II |
| 5,392,650 A | 2/1995 | O'Brien et al. |
| 5,559,291 A * | 9/1996 | Hasegawa ................ 73/504.12 |
| 5,932,803 A | 8/1999 | Wyse |
| 5,962,788 A * | 10/1999 | Fawcett .................. 73/516.36 |
| 5,987,986 A | 11/1999 | Wyse et al. |
| 5,996,411 A * | 12/1999 | Leonardson et al. ..... 73/514.37 |
| 6,338,274 B1 * | 1/2002 | Carroll .................... 73/514.15 |

FOREIGN PATENT DOCUMENTS

| WO | WO 00/07028 | 2/2000 |
|---|---|---|

* cited by examiner

*Primary Examiner*—Helen Kwok

(57) ABSTRACT

A micromachined silicon tuned accelerometer gyro is formed out of silicon wafers, by micromachining. The top and bottom cover which include driver, forcer, tuning and guard ring elements mounted therein are micromachined in arrays on silicon-on-insulator (SOI) wafers. The center (driver and sensing) element between the top and bottom is micromachined in an array of four inch diameter silicon wafers. The driver and sensing structure is a tuned pendulum attached by flexure joints to a vibrating structure which is in then suspended by a parallelogram dither suspension. The pendulum is tuned by adjusting the magnitude of a d.c. signal to match the natural frequency of the pendulum to the natural frequency of the vibrating structure. The dither suspension flexures of the vibrating structure is uniquely defined and easily machined but yet provides a dither suspension that restrains the vibrating structure within its vibrating plane with no harmonic distortion.

18 Claims, 3 Drawing Sheets

MICROMACHINED SILICON GYRO USING TUNED ACCELEROMETER

BACKGROUND OF THE INVENTION

1. Field of the Invention

The present invention relates to an inertial instrument and more specifically pertains to vibrating accelerometers used as multi-sensors for measuring linear acceleration and rate of rotation of a moving body.

2. Description of Prior Art

Gyroscopes and accelerometers are well known for use sensing angular velocity and acceleration for determining location, direction, position and velocity of a moving vehicle.

A desire for miniaturization, reduced cost and improved performance requires almost impossible accuracies in the actual structure of the accelerometer.

SUMMARY OF THE INVENTION

The present invention provides a tuned-accelerometer gyro micromachined out of silicon wafers. The sensing and driver elements comprise a tuned silicon pendulum attached by a flexure hinge to a vibrating structure which is in turn is attached to a frame by dither suspension which restrains movement of the vibrating structure to in the plane of motion. The pendulum is free to rotate about its hinge out of the plane of the vibrating motion. Four flexures forming a parallelogram dither suspension are located in pairs on opposite sides of the pendulum, close to the top and bottom ends of the pendulum.

BRIEF DESCRIPTION OF THE DRAWINGS

The exact nature of this invention as well as its objects and advantages will become readily apparent from consideration of the following specification in relation to the accompanying drawings in which like reference numerals designate like parts throughout the figures thereof and wherein.

DESCRIPTION OF THE PREFERRED EMBODIMENT

Figure 1:
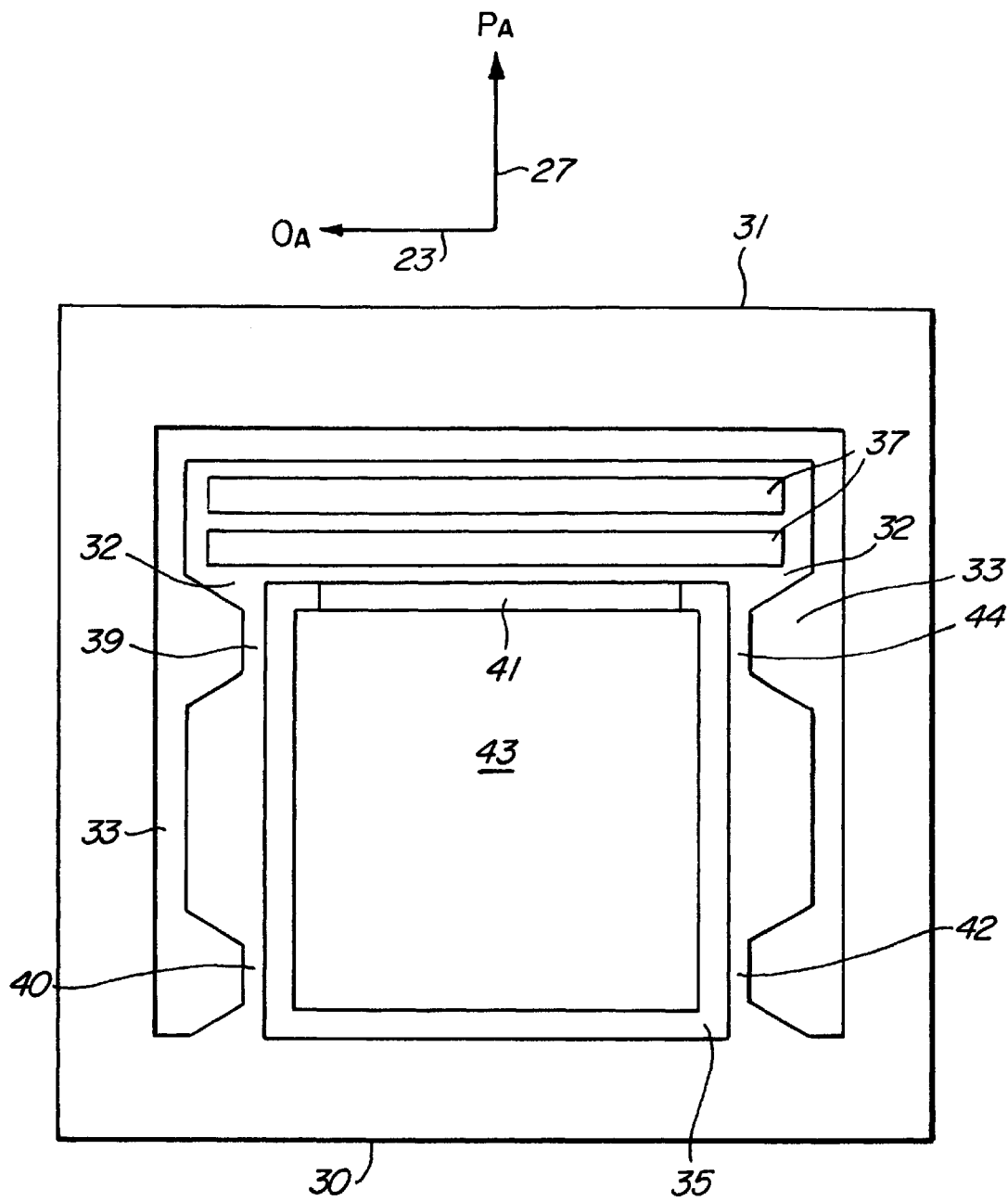
FIG. 1 is a top plane view of the driven and sensing element of an accelerometer according to the present invention.
Figure 2:
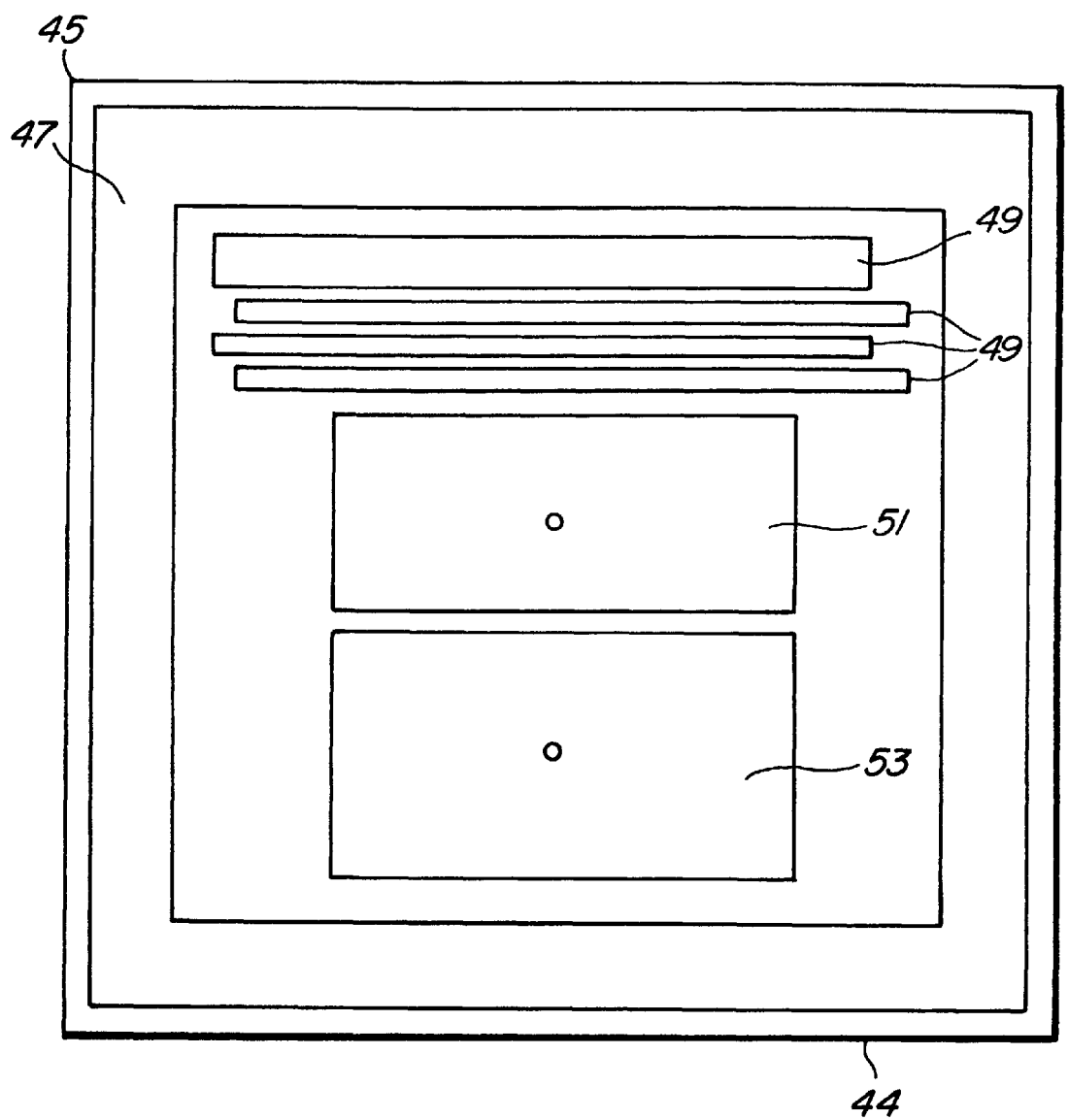
FIG. 2 is a top plane view of the top and bottom cover containing driver, forcer, and tuning electrodes for an accelerometer according to the present invention.

The silicon accelerometer-gyro of the present invention is based on the sensing and measuring of Coriolis induced accelerations acting on a vibrating accelerometer undergoing rotation, as a means for measuring angular rotation rates. The accelerometer consists of three elements, a driven and sensing element (FIG. 1), a top cover with driver, forcer and tuning electrodes (FIG. 2), and a bottom cover with driver, forcer and tuning electrodes (FIG. 2).

Each driven and sensing element 30 is preferably micromachined in an array on four-inch or greater diameter, 500 microns or thicker, silicone wafers. The driven and sensing element consists of a tuned pendulum or proof mass 43 supported by a pendulum flexure hinge 41 fastened to a vibratory driving structure 32 which includes four dither suspension flexures 39, 40, 42 and 44. Driven and pickoff elements 37 are micromachined on structure 32. The tuned pendulum or proof mass 43 flexes about flexure hinge 41 in a direction perpendicular to the plane of the pendulum of FIG. 1. The perimeter of the pendulum 43 is located within an open channel 35 which is cut out of the vibratory driving structure 32.

The vibratory driving structure 32 is supported within a frame 31 to vibrate in the plane of the pendulum of FIG. 4 along the $O_A$ axis 23. The vibratory driving structure is uniquely defined by the cut-out space 33 between the structure 32 and frame 31, creating four dither suspension flexures 39, 40, 42 and 44. These flexures provide a highly linear dither suspension for the vibratory driving structure 32 and pendulum 43.

In a closed loop operation, the natural frequency of the pendulum 43 for simple rotation about flexure hinge 41 is designed to be 1% to 2% higher than the natural frequency of the entire vibratory driving structure 32 and pendulum 43, suspended by the four dither suspension flexures 39, 40, 42 and 44.

The vibratory structure 32 including pendulum 43 is driven into oscillation at its natural frequency and at a defined amplitude using electrostatic forcing and elements 37 and 49. The detailed design of the forcing and pickoff elements is dependent on the specific electronic circuit design selected for the dither drive. This type of circuitry and design is well known in this art and will not be further described herein.

Both the top and bottom cover which includes the driver, forcer, tuning electrodes and guard ring 47 mounted thereon as a part thereof, are micromachined in arrays on four inch or greater diameter silicon-on-insulator (SOI) wafers. The SOI wafer consists of a handle wafer and a device wafer fusion bonded together with an intervening silicon dioxide dielectric layer.

Referring now to FIG. 2, which shows the top 44 of the tuned accelerometer gyro of the present invention, the handle wafer part of the SOI wafer forms the cover 45. The device layer of the SOI wafer is micromachined to form the guard ring 47, tuning and forcing electrodes 51 and 53, and driver and pickoff electrodes 49. The device layer 47 is dielectrically isolated from the handle wafer or cover 45 by an intervening silicon dioxide dielectric layer (not shown). Through holes are micromachined in the cover 45 and through the silicon dioxide dielectric isolation layer to permit metalization to form a contact to the electrodes in the device layer of the cover, in other words, the tuning and forcing electrodes and driver and pickoff electrodes. It should be understood that FIG. 2 illustrates not only the top but also the bottom cover for the driven and sensing elements of the accelerometer gyro of the present invention.

A silicon dioxide dielectric layer is also thermally grown and patterned on both sides of the frame 31 (FIG. 1) of the driven and sensing element 30. Another silicon dioxide dielectric layer is also thermally grown and patterned on the guard ring 47 for the top and bottom cover driver, forcer and tuning element wafers.

The silicon dioxide layers, one on the guard ring of the top and bottom cover, and one on the frame of the driven and sensing elements define the gap between the pendulum 43 and the forcer and tuning electrodes 51 and 53, as well as the gap between the driven and pickoff electrodes 49 and the driver and pickoff electrodes when the three wafers are joined.

Figure 3:
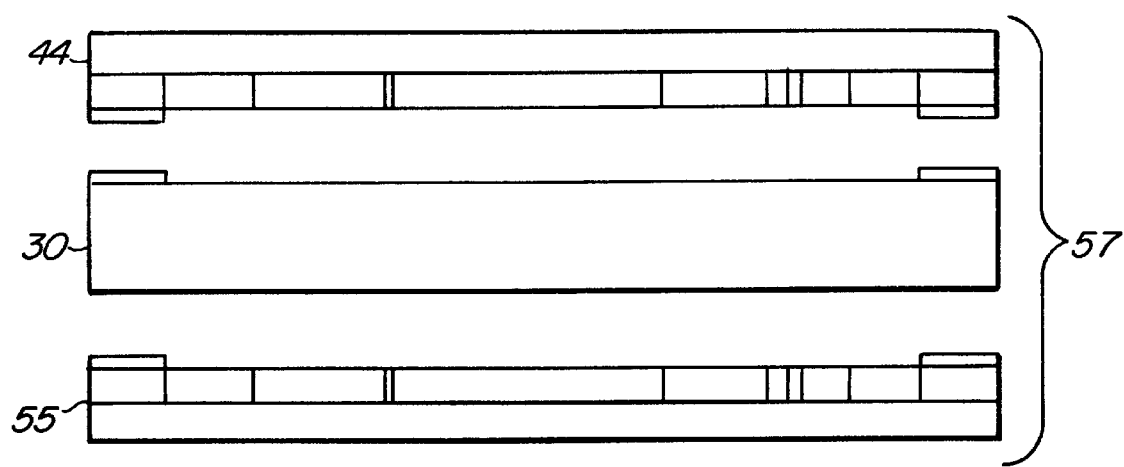
FIG. 3 is a side plane view showing the three elements of the tuned accelerometer of the present invention before assembly.

Referring now to FIG. 3, the top 44, the driven and sensing elements 30, and the bottom 55 are illustrated as making up the complete accelerometer gyro 57 according to the present invention. These three elements, as previously described, are joined together using a direct wafer fusion bonding, or thermal compression bonding of metal traces.

In operation, the silicon tuned accelerometer gyro is integrated with its dither drive and sensing electronics which may be open loop or closed loop. In closed loop operation, the drive electronics sense the position of the vibratory structure and apply signals to the driven electrodes to electrostatically force the vibratory structure to oscillate at its natural frequency and defined amplitude. The sense electronics servo the position of the pendulum by applying signals to the forcer and pickoff electrodes to null the pendulum position at its resonant frequency. A d.c. signal is provided to the tuning electrodes to introduce a negative electrostatic spring force on the pendulum. The magnitude of the d.c. signal is determined by the magnitude of the negative spring required to reduce the natural frequency of the pendulum to match the natural frequency of the vibratory structure. The output of the servo electronics is a d.c. signal proportional to the magnitude of the Coriolis acceleration sensed, which in turn is proportional to the angular rotation rate being measured.

The configuration for the silicon tuned-accelerometer gyro described so far is for a single axis, non-counterbalanced closed loop gyro. It should be noted that by assembling two silicon tuned accelerometer gyro chips with their accelerometer centers of percussion aligned collinear, common mode rejection is achieved for linear vibration, angular vibration and acoustic noise, as well as introducing a measure of counterbalancing for reduced mounting sensitivity.

In a configuration where two such silicon tuned accelerometer gyros are assembled with their centers of percussion aligned collinear, the sensitivity to angular vibration is virtually eliminated. Common mode rejection of linear vibration is achieved by differencing the output of the two gyros which cancels the linear vibration signals when the gyro scale factors are made equal and doubles the angular rate signal.

The silicon tuned-accelerometer gyro described above can also be operated open loop for reduced cost but at the sacrifice of reduced performance. In the open loop configuration, the natural frequencies of the vibratory structure and the pendulum are separated by an order of magnitude greater than the bandwidth required. The differences in these frequencies is a trade off between the bandwidth required for the application and sensitivity.

The tuned-accelerometer gyro described above exhibits higher signal to noise ratio for equivalent size chips or smaller chips allowing for more chips per wafer and attendant lower chip cost for the same signal to noise ratio. This benefit is due to the fact that the entire sensing element (pendulum) has the full dither velocity rather than reducing to zero at the center of an angularly oscillating sensing element, as in prior art silicon gyros. In addition, the signal to noise ratio is potentially higher due to higher amplitude of dither motion. This is due to lower stresses in the dither suspension flexure.

The silicon tuned-accelerometer gyro also exhibits less harmonic distortion of the dither drive position and velocity of the vibratory structure. Precision demodulation and remodulation with reference to the dither position and velocity of the vibratory structure is critical to the performance of any gyro. The reduced harmonic distortion is due to the elimination of the hard spring inherent in prior art silicon gyro dither drives. These hard spring characteristics result from the tensioning of the dither drive flexures with angular displacement. The flexures supporting the vibratory structure of the silicon tuned accelerometer gyro of the present invention are not tensioned by linear displacement.

What is claimed is:

1. An accelerometer gyro for sensing linear acceleration having a sensing element formed from a substantially planar monolithic material, the accelerometer gyro sensing element comprising:

a frame portion;

a vibrating structure having a top, bottom and sides disposed within said frame portion and connected to said frame portion by a suspension, said vibrating structure and the suspension having a natural frequency of vibration; and a pendulum disposed within said vibrating structure and connected to said vibrating structure by a flexure joint, the pendulum and the flexure joint being designed to have a natural frequency of oscillation that is related to the natural frequency of vibration of the vibrating structure and suspension.

2. The accelerometer gyro of claim 1 wherein the pendulum and the flexure joint are designed to have a natural frequency of oscillation that is higher than the natural frequency of vibration of the vibrating structure.

3. The accelerometer gyro of claim 1 wherein the natural frequency of oscillation of the pendulum is up to 2% higher than the natural frequency of vibration of the vibrating structure and the suspension.

4. The accelerometer gyro of claim 3 wherein the vibrating structure and pendulum are micromachined out of silicon wafers at least 500 microns thick.

5. The accelerometer gyro of claim 1 wherein the suspension of the vibrating structure comprises flexures, each flexure having a long and short axis with the long axis of each flexure running parallel with the sides of the pendulum.

6. The accelerometer gyro of claim 1 further comprising a top and bottom cover for the frame portion made from silicon-on-insulator wafers having a handle wafer and a device wafer fusion bonded together with a silicon dioxide dielectric layer in between.

7. The accelerometer gyro of claim 6 wherein the top and bottom covers include drivers, force and tuning electrodes, and ohmic contacts formed in the device wafer.

8. The accelerometer gyro or claim 7 runner comprising a silicon dioxide layer on both sides of the frame portion and around the perimeter of the top and bottom covers, the thickness of the layer chosen to define the spacing between the pendulum and the forcer and tuning electrodes when the top and bottom covers and frame portion are joined.

9. The accelerometer gyro of claim 8 wherein the pendulum and the flexure joint are designed to have a natural frequency of oscillation that is higher than the natural frequency of vibration of the vibrating structure and suspension.

10. The accelerometer gyro of claim 9 wherein the natural frequency of oscillation of the pendulum is up to 2% higher than the natural frequency of vibration of the vibrating structure.

11. The accelerometer gyro of claim 10 wherein the vibrating structure and pendulum are micromachined out of silicon wafers at least 500 microns thick.

12. The accelerometer gyro of claim 1 further comprising a signal generator for applying a d.c. signal of predetermined amplitude to reduce the natural frequency of the pendulum and the flexure joint to the natural frequency of the vibrating structure.

13. The accelerometer gyro of claim 12 wherein the natural frequency of oscillation of the pendulum is up to 2% higher than the natural frequency of vibration of the vibrating structure.

14. The accelerometer gyro of claim 13 wherein the vibrating structure and pendulum are micromachined out of silicon wafers at least 500 microns thick.

15. The accelerometer gyro of claim 14 wherein the suspension of the vibrating structure comprises flexures, each flexure having a long and short axis with the long axis of each flexure running parallel with the sides of the pendulum.

16. The accelerometer gyro of claim 15 further comprising a top and bottom cover for the frame portion made from silicon-on-insulator wafers having a handle wafer and a device wafer fusion bonded together with a silicon dioxide dielectric layer in between.

17. The accelerometer gyro of claim 16 wherein the top and bottom covers include drivers, and force and tuning electrodes, a guard ring and ohmic contacts formed in the device wafer.

18. The accelerometer gyro of claim 17 further comprising a silicon dioxide layer on both sides of the frame portion and around the perimeter of the top and bottom covers, the thickness of the layer chosen to define the spacing between the pendulum and the forcer and tuning electrodes when the top and bottom covers and frame portion are joined.

* * * * *